UNITED STATES PATENT OFFICE.

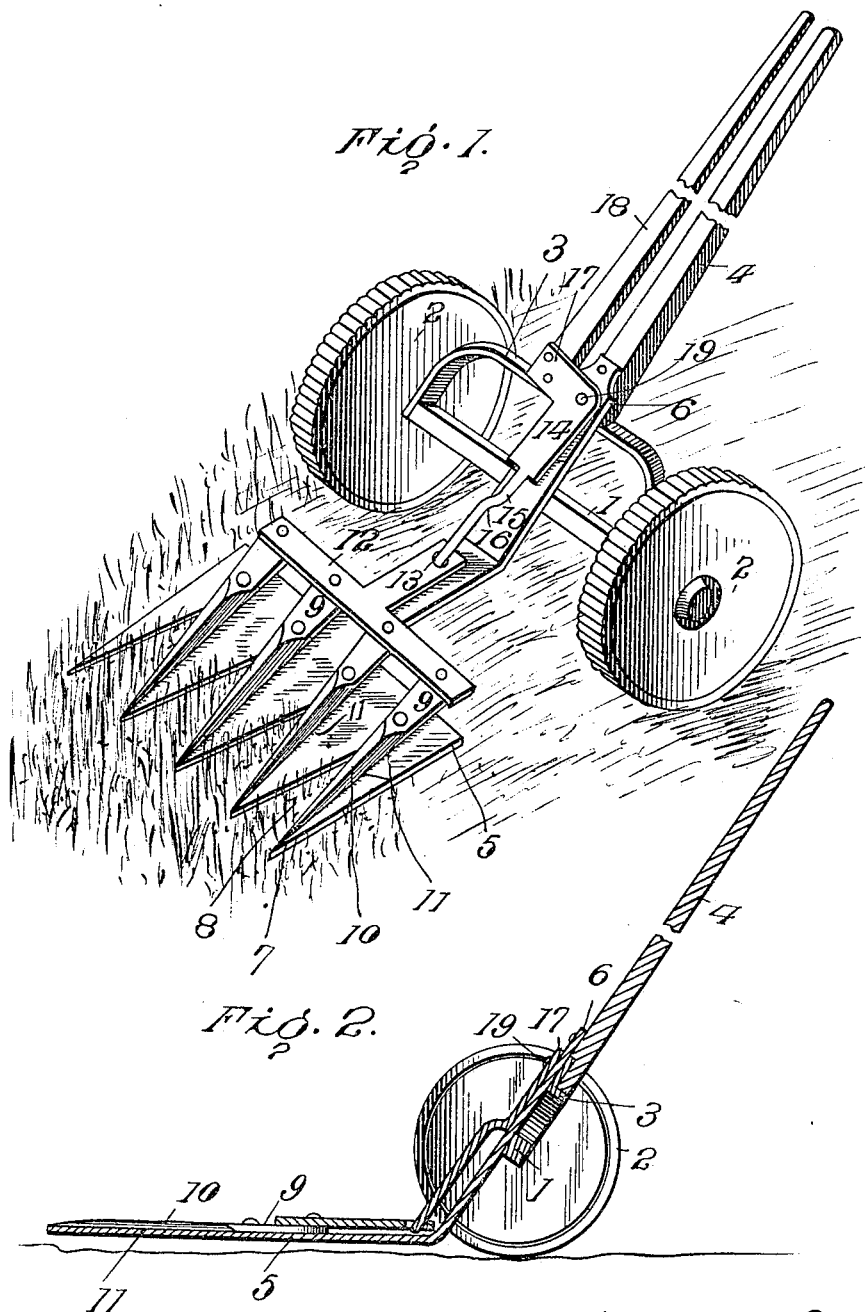

HENRY B. PITNER, OF OLEAN, NEW YORK.

LAWN-TRIMMER.

No. 818,708.  Specification of Letters Patent.  Patented April 24, 1906.

Application filed September 18, 1905. Serial No. 278,918.

*To all whom it may concern:*

Be it known that I, HENRY B. PITNER, a citizen of the United States, residing at Olean, in the county of Cattaraugus and State of New York, have invented certain new and useful Improvements in Lawn-Trimmers, of which the following is a specification, reference being had therein to the accompanying drawings.

My invention relates to lawn-trimmers, and more particularly to that class having grass cutters or clippers which consist of a fixed plate mounted on a frame carried by wheels and operating in combination with pivotally-mounted teeth or cutting members adapted to alternate with cutting members or teeth on the fixed plate, so that the grass will be cut or clipped by the united action of said teeth and cutting members, one of the objects being to provide a device of the character described that shall be simple and inexpensive in construction, easy of manipulation, durable and effective in operation, and more particularly adapted for use in trimming the edges of lawns or grass plats and for reaching recesses and corners inaccessible to the ordinary lawn-mower.

Other objects and advantages of my invention, as well as the structural features by means of which these objects are attained, will be made clear by an examination of the specification, taken in connection with the accompanying drawings, in which the same reference-numerals indicate corresponding portions throughout, and in which—

Figure 1 is a perspective view of my complete device, and Fig. 2 is a longitudinal section.

1 designates an axle having suitably journaled in bearings thereon the wheels 2, having peripheries ridged or roughened to prevent them from slipping. Mounted on the axle is a bowed projection 3, which, in conjunction with said axle, forms a supporting-frame upon which is fixed a handle 4.

5 designates a horizontally-arranged plate which is secured to said frame by means of a tongue 6, formed integral therewith and bent at an obtuse angle, as shown. The plate 5 is provided with a plurality of teeth or cutting members 7, formed integral therewith, both edges of each finger being arranged at an acute angle to the upper face thereof to form a cutting edge. These fingers are also pointed at their outer ends and converging to meet at their bases, thus leaving V-shaped apertures 8 between them. Pivotally mounted on said plate 5 are a plurality of cutting blades or members 9, beveled, as shown at 10, to present a cutting edge 11 to the cutting edges of the teeth or cutting members 7. It will be observed that each cutting blade or member 9 is pivoted on the plate 5 at a point directly in the rear of the junction of two of the teeth or members 7. These cutting-blades 9 are at their rear ends pivotally connected with a T-shaped frame 12, which said frame is provided with a rounded opening 13. Pivotally mounted on the tongue 6 is a bell-crank lever 14, the lower arm of which is longer and terminates in a rounded part 15, said part being bent at 16 to throw a portion thereof outward from the tongue 6, which said portion enters the opening 13 and forms a sliding pivotal connection by means of which a rocking or oscillating motion may be imparted thereto. Fixed on the upper and shorter arm 17 of the bell-crank lever is a handle 18 of the same length as the handle 4.

In operation the handle 4 is grasped by the left hand of the operator, and by it motive power is conveyed to the axle to convey the trimmer over the ground by means of the wheels 2. The handle 18 is actuated by the right hand of the operator, and when it is moved to and fro on the pivot 19 the bell-crank lever is given a rocking or oscillating motion, which is imparted, by the means hereinbefore described, to the frame 12, thus causing the cutting-blades 9 to rock or oscillate and their cutting edges to cross the apertures or openings 8. Each cutting-blade being provided with two cutting edges presents first one of said edges to one of the fingers 7 and then the opposite edge to the opposite finger, thus operating alternately to and fro and clipping the grass as it enters the apertures or openings 8.

This trimmer being mounted on a single axle, it will be observed that by raising or lowering the handles the cutting blades or members may be raised or lowered to cut or clip the grass at any desired height.

Having thus described my said invention, what I claim as new, and desire to secure by Letters Patent of the United States, is—

1. In a device of the character described, the combination, with a wheeled frame and a handle fixed thereon, of a plate secured to the frame and arranged at an angle therewith, a plurality of cutting members formed integral with the plate, a plurality of cutting members pivotally mounted on the plate and adapted to present cutting edges to the cutting edges of the first-mentioned members, a T-shaped plate having the pivotally-mounted cutting members pivotally connected therewith at their rear ends, a bell-crank lever having a sliding pivotal connection with the T-shaped plate, and a handle fixed on the bell-crank lever whereby the same is actuated to impart oscillating or rocking motion to the pivotally-mounted cutting members.

2. In a device of the character described, a wheeled frame, a handle fixed thereon, a tongue carried by the frame, a plate formed integral with the tongue and arranged at an angle therewith, a plurality of cutting members formed integral with the plate, a plurality of cutting members pivotally mounted on the plate and adapted to present cutting edges to the cutting edges of the first-mentioned members, a T-shaped plate having the pivotally-mounted cutting members having a sliding pivotal connection therewith at their rear ends, a bell-crank lever pivotally connected with the T-shaped plate, and a handle fixed on the bell-crank lever whereby the same is actuated to impart rocking or oscillating motion to the pivotally-mounted cutting members.

3. A device of the character described, comprising a wheeled frame, a handle fixed thereon, a horizontally-arranged plate carried thereby, said plate having a plurality of cutting members formed integral therewith, a bell-crank lever pivoted on the frame, a handle fixed on one arm of the bell-crank lever, the other arm of said bell-crank lever terminating in a rounded part or projection, a T-shaped frame having a rounded opening in which the rounded point or projection on the bell-crank lever enters to form a pivot by means of which rocking or oscillating motion is imparted to the T-shaped frame when the bell-crank lever is rocked, and a cutting member pivotally mounted on the plate at each junction of the first-mentioned cutting members, each of the second cutting members being pivotally mounted at its rear end on the T-shaped frame by means of which rocking or oscillating motion is imparted thereto.

In testimony whereof I hereunto affix my signature in presence of two witnesses.

HENRY B. PITNER.

Witnesses:
W. A. OSTERHOUDT, Jr.,
D. H. SULLIVAN.